(12) United States Patent
Schwarz et al.

(10) Patent No.: US 9,374,355 B2
(45) Date of Patent: Jun. 21, 2016

(54) PROGRAMMING VEHICLE MODULES FROM REMOTE DEVICES AND RELATED METHODS AND SYSTEMS

(71) Applicant: GM GLOBAL TECHNOLOGY OPERATIONS LLC, Detroit, MI (US)

(72) Inventors: Jonathan R. Schwarz, Lake Orion, MI (US); Douglas C. Martin, Oxford, MI (US); William E. Mazzara, Jr., Drayton Plains, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/064,425

(22) Filed: Oct. 28, 2013

(65) Prior Publication Data

US 2015/0121071 A1 Apr. 30, 2015

(51) Int. Cl.
*H04L 9/32* (2006.01)
*H04L 29/06* (2006.01)

(52) U.S. Cl.
CPC ............... *H04L 63/08* (2013.01); *H04L 63/12* (2013.01)

(58) Field of Classification Search
CPC .................................................... H04L 63/068
USPC ........................................................ 713/168
See application file for complete search history.

(56) References Cited

U.S. PATENT DOCUMENTS

| 6,438,468 | B1 | 8/2002 | Muxlow et al. |
| 6,976,167 | B2 * | 12/2005 | Nenashev ............... 713/168 |
| 7,418,596 | B1 * | 8/2008 | Carroll et al. ............... 713/169 |
| 7,869,906 | B2 * | 1/2011 | Louch et al. ..................... 701/1 |
| 8,543,805 | B2 * | 9/2013 | Ovsiannikov ............... 713/151 |
| 8,948,934 | B2 | 2/2015 | Lee et al. |
| 2008/0269979 | A1 | 10/2008 | Hermann et al. |
| 2010/0082559 | A1 | 4/2010 | Sumcad et al. |
| 2011/0083161 | A1 | 4/2011 | Ishida et al. |
| 2011/0197187 | A1 | 8/2011 | Roh |
| 2011/0215758 | A1 | 9/2011 | Stahlin et al. |
| 2012/0143402 | A1 | 6/2012 | Kim et al. |
| 2012/0221173 | A1 | 8/2012 | Ampunan et al. |
| 2013/0079950 | A1 * | 3/2013 | You .................................. 701/1 |
| 2013/0173112 | A1 * | 7/2013 | Takahashi et al. ............. 701/36 |
| 2013/0179689 | A1 | 7/2013 | Matsumoto et al. |
| 2013/0185766 | A1 | 7/2013 | Fujiki et al. |

(Continued)

OTHER PUBLICATIONS

Jing Zhu and Sumit Roy, MAC for Dedicated Short Range Communications in Intelligent Transport System, IEEE Communication Magazin Dec. 2003, 0163-6804/03,pp. 60-67.*

(Continued)

*Primary Examiner* — Morshed Mehedi
*Assistant Examiner* — Khalil Naghdali
(74) *Attorney, Agent, or Firm* — Ingrassia Fisher & Lorenz, P.C.

(57) ABSTRACT

Methods, apparatus and systems are provided for programming a vehicle module. An exemplary vehicle includes a first module, a gateway module communicatively coupled to the first module, and an update module communicatively coupled to the gateway module. The update module is configured to provide authorization information and programming data to the gateway module. The gateway module is configured to verify that programming of the first module is authorized based at least in part on the authorization information and provide the programming data to the first module after verifying that the programming of the first module is authorized.

17 Claims, 4 Drawing Sheets

(56) References Cited

U.S. PATENT DOCUMENTS

| | | |
|---|---|---|
| 2013/0261941 A1 | 10/2013 | Nishimura et al. |
| 2013/0268754 A1 | 10/2013 | Baltes et al. |
| 2013/0275761 A1 | 10/2013 | Catsburg et al. |
| 2013/0318357 A1 | 11/2013 | Abraham et al. |
| 2013/0339721 A1 | 12/2013 | Yasuda |
| 2014/0114497 A1 | 4/2014 | Miyake |
| 2014/0325602 A1 | 10/2014 | Kwon et al. |
| 2015/0051787 A1 | 2/2015 | Doughty et al. |
| 2015/0095997 A1 | 4/2015 | Mabuchi |

OTHER PUBLICATIONS

Hossain, Irina; Mahmud, Syed Masud; Hwang, Moon Ho; "Performance Evaluation of Mobile Multicast Session Initialization Techniques for Remote Software Upload in Vehicle ECUs", IEEE 72nd Vehicular Technology Conference, Sep. 6-9, 2010, 5 pages.

Khanapurkar, Milind; Bajaj, Preeti; Gharode, Dakshata; "A Design Approach for Intelligent Vehicle Black Box System with Intravehicular communication using LIN/Flex-ray Protocols", IEEE International Conference on Industrial Technology, Apr. 21-24, 2008, 6 pages.

USPTO, Notice of Allowance and Fee(s) Due in U.S. Appl. No. 14/064,386 mailed Nov. 24, 2015.

USPTO, Response Accompanying Request for Continued Examination in U.S. Appl. No. 14/064,386 mailed Oct. 7, 2015.

U.S. Appl. No. 14/064,386, filed Oct. 28, 2013.

USPTO, Office Action for U.S Appl. No. 14/064,386 mailed Mar. 6, 2015.

USPTO, Response to Office Action for U.S. Appl. No. 14/064,386 mailed May 26, 2015.

USPTO, Final Office Action for U.S Appl. No. 14/064,386 mailed Jul. 8, 2015.

Jing Zhu and Sumit Roy, MAC for Dedicated Short Range Communications in Intelligent Transport System, IEEE Communications Magazine, Dec. 2003, 0163-6804/03, pp. 60-67.

* cited by examiner

PROGRAMMING VEHICLE MODULES FROM REMOTE DEVICES AND RELATED METHODS AND SYSTEMS

CROSS-REFERENCE TO RELATED APPLICATIONS

The subject matter described herein is related to the subject matter described in U.S. patent application Ser. No. 14/064,386, filed concurrently herewith.

TECHNICAL FIELD

Embodiments of the subject matter described herein generally relate to vehicle systems, and more particularly relate to systems and methods for securely programming a module within a vehicle using programming information from a remote device.

BACKGROUND

In recent years, advances in technology have led to substantial changes in the design of automotive vehicles. Modern vehicles include a number of electronic components, such as, for example, engine control units (ECUs), traction control systems, power steering systems, braking systems, climate control systems, navigation systems, infotainment systems, and the like. Additionally, modern vehicles often are capable of supporting communications to/from external components, for example, via external communications networks (e.g., cellular networks, wireless networks, personal area networks, or the like) or a physical interface (e.g., a bus interface or the like).

During the lifetime of a vehicle, it may be desirable to reprogram or otherwise update one or more of the vehicle electronic components, for example, to support or otherwise provide new features and/or functionality or to resolve potential issues with existing features and/or functionality. Allowing vehicles to receive updates or otherwise be reprogrammed from an external component poses numerous cybersecurity risks. Accordingly, it is desirable to provide systems and methods for securely programming vehicle electronic components while minimizing vulnerability or susceptibility to cyberattacks. Other desirable features and characteristics will become apparent from the subsequent detailed description and the appended claims, taken in conjunction with the accompanying drawings and the foregoing technical field and background.

SUMMARY

In one of various exemplary embodiments, an apparatus for a vehicle is provided. The vehicle includes a first module, a gateway module communicatively coupled to the first module, and an update module communicatively coupled to the gateway module. The update module is configured to provide authorization information and programming data to the gateway module. The gateway module is configured to verify that programming of the first module is authorized based at least in part on the authorization information and provide the programming data to the first module after verifying that the programming of the first module is authorized.

In another embodiment, a method of programming a vehicle module communicatively coupled to a gateway module is provided. The gateway module generates session information for a programming update for the vehicle module. The method continues by decrypting authorization information using the session information to obtain a decrypted key, authenticating the programming update based at least in part on the decrypted key, and providing, via the gateway module, programming data for the programming update to the vehicle module after authenticating the programming update.

According to another of various exemplary embodiments, a vehicle system is provided. The vehicle system includes a first communications network, a second communications network, a vehicle module coupled to the second communications network, an update module coupled to the first communications network, and a gateway module coupled to the first communications network and the second communications network. The update module is configured to obtain programming data for the vehicle module, obtain authorization information from a remote device, and provide the authorization information and the programming data to the gateway module via the first communications network. The gateway module is configured to provide the programming data to the vehicle module after authenticating the authorization information. The vehicle module is configured to update an application on the vehicle module based at least in part on the programming data after receiving the programming data from the gateway module.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Embodiments of the subject matter described herein relate to programming a module in a vehicle, such as an automobile, using programming information obtained from a remote device. As described in greater detail below, a programming update for an application on a vehicle module to be programmed (alternatively referred to herein as a target application on a target module) is obtained by another module in the vehicle that is communicatively coupled to the vehicle module via a gateway module. In this regard, the module that obtains the programming update is communicatively coupled to the gateway module via a communications network that is different from the communications network that the target module is coupled to. For purposes of explanation, but without limitation, the module that obtains the programming update may alternatively be referred to herein as an update module. The programming update includes a programming data portion, which may be realized as a file or another logical segment of data that includes a set of executable instructions (e.g., code, script, or the like), which are capable of being read and executed by the target module to change, modify, update, or otherwise influence the target application executing thereon. In other words, the target application is updated based at least in part on the programming data in response to the set of instructions from the programming data being executed by the target module.

In exemplary embodiments, the update module requests that the gateway module enable a programming session with the target module after obtaining the programming update. The gateway module stores or otherwise maintains one or more keys that are associated with the vehicle, and in response to the initial programming request, the gateway module dynamically generates session information using one or more of the stored keys and provides the session information to the update module. The session information is utilized to authenticate that the programming session is being requested from a trusted gateway module, and accordingly, the session information may alternatively be referred to herein as session authentication information. After receiving the session authentication information, the update module requests authorization of the programming session from a remote device by providing the session authentication information. The remote device has access to the one or more keys that are associated with the vehicle, and utilizes those keys to verify, confirm, or otherwise authenticate that the programming session requested by the update module of a particular vehicle involves a trusted gateway module in that vehicle. Depending on the embodiment, the remote device may be communicatively coupled to the update module in the vehicle via a communications network or via an input interface coupled to the update module (e.g., by inserting the remote device in the input interface).

After authenticating the session information, the remote device also determines whether programming of the particular target module in the vehicle is authorized based on one or more criteria. For example, the remote device may monitor programming requests associated with a particular vehicle, target module and/or update module and restrict the amount or frequency of programming sessions that are allowed for that particular vehicle, target module and/or update module. In this regard, if a number of programming requests exceeds an allowed threshold number of programming requests, the remote device does not authorize the programming session and fails to provide a response to the programming request that would otherwise enable the programming session. Conversely, if the remote device determines the programming session is authorized, the remote device generates an authorization notification (or message) and provides the authorization notification to the update module, which, in turn, transmits the authorization notification to the gateway module. The authorization notification includes authorization information utilized by the gateway module to verify, confirm, or otherwise authenticate that the authorization is provided by a trusted remote device, and accordingly, the authorization information may alternatively be referred to herein as authorization authentication information. After the gateway module verifies, confirms, or otherwise authenticates the authorization information, the gateway module allows or otherwise enables the programming data for the programming update to be provided by the update module to the target module via the gateway module, thereby allowing the update module to program or otherwise update the target application on the target module. In this regard, in the absence of authenticated authorization from a trusted remote device, by default, the gateway module prevents the update module from communicating programming data to the target module or otherwise causing the target module to enter a programming mode.

In one or more exemplary embodiments, the remote device generates the authorization information by encrypting one or more of the keys associated with the vehicle using the session authentication information, whereby to authenticate the programming authorization as being provided from a trusted remote device, the gateway module uses the session authentication information it previously generated to decrypt the authorization authentication information, resulting in one or more decrypted keys. When the decrypted key(s) match the stored key(s) associated with the vehicle that are maintained by the gateway module, the gateway module verifies that the programming of the target module has been authorized by a trusted remote device.

Figure 1:
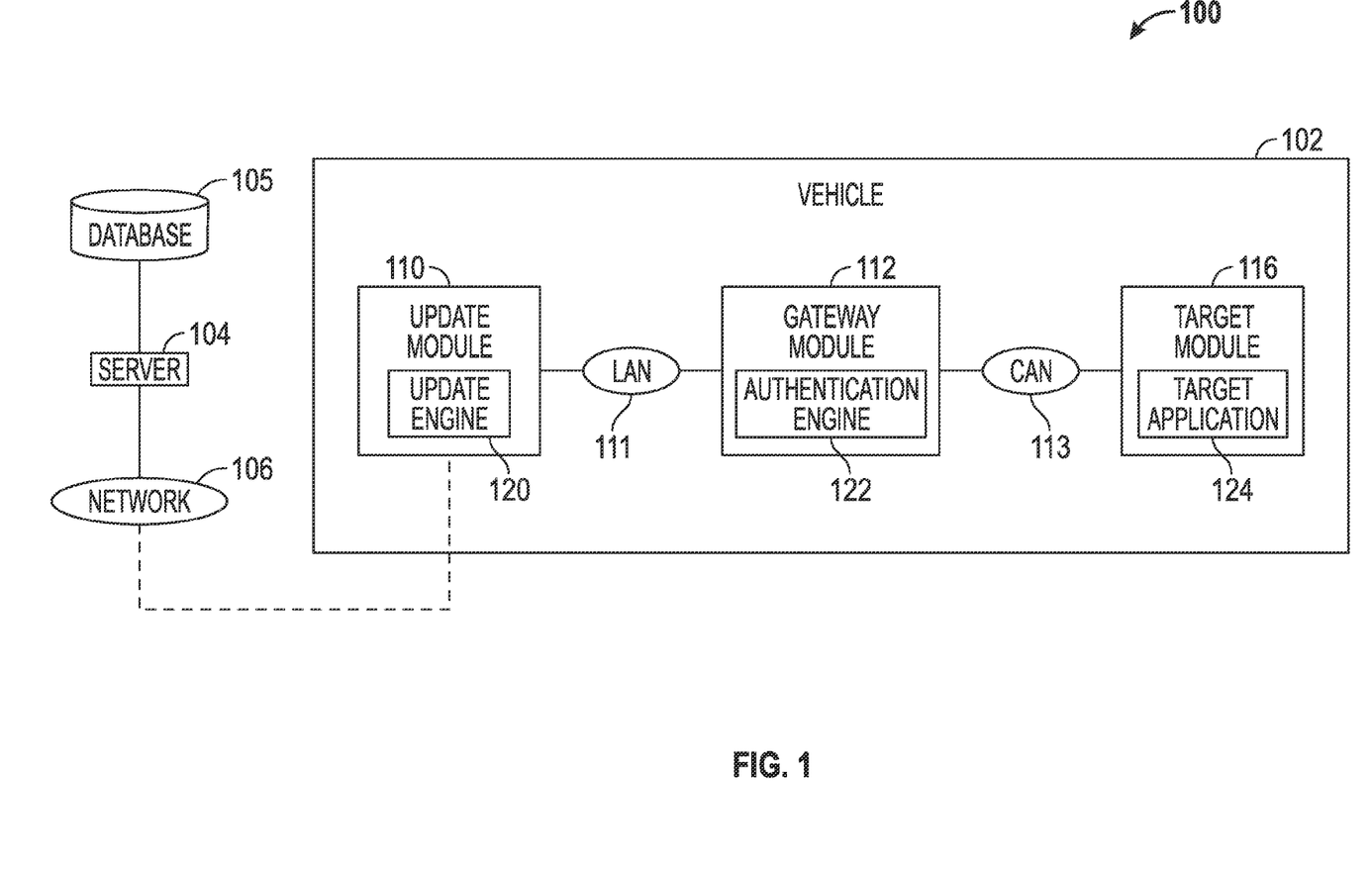
FIG. 1 is a block diagram of an exemplary vehicle communications system in accordance with one or more embodiments.

Referring now to FIG. 1, in one or more exemplary embodiments, a vehicle communications system 100 includes a vehicle 102 capable of communicating with a remote device 104 via a communications network 106 that is external to the vehicle 102, such as, for example, a cellular network, a satellite network, a wireless network, a wide area network, or the like. In the illustrated embodiment, the vehicle 102 includes an update module 110 configured to communicate via the network 106 and download or otherwise receive, from the remote device 104 via the network 106, programming updates that are subsequently utilized to program or otherwise update another module 114 in the vehicle 102. In exemplary embodiments, the vehicle 102 includes a gateway module 112 that is communicatively coupled to the update module 110 and authenticates attempts to program the target module 114 in the vehicle 102 are authorized by the remote device 104. In this regard, when the gateway module 112 fails to authenticate programming of the target module 114 as being authorized by the remote device 104, the gateway module 112 prevents or otherwise restricts programming of that target module 114. As described in greater detail below in the context of FIG. 3, the authorization authentication information utilized by the gateway module 112 to authenticate the programming update as being authorized is selectively provided by the remote device 104 based on the amount or frequency (or rate) of programming attempts for the target module 114 and/or other factors that may be indicative of a potential cyberattack or other vulnerability. Thus, the remote device 104 is also capable of preventing or otherwise restricting programming of the target module 114.

Still referring to FIG. 1, in one or more exemplary embodiments, the vehicle 102 is realized as an automobile, and depending on the embodiment, the vehicle 102 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 102 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor. In alternative embodiments, the vehicle 102 may be a plug-in hybrid vehicle, a fully electric vehicle, a fuel cell vehicle (FCV), or another suitable alternative fuel vehicle.

The remote device 104 generally represents a computing system or another combination of processing logic, circuitry, hardware, and/or other components that is coupled to the network 106 and capable of communicating programming updates to the vehicle 102 and supporting the processes, tasks, operations, and/or functions described herein. For example, in the illustrated embodiment of FIG. 1, the remote device 104 may be realized as a computer server that includes a processing system and a data storage element (or memory) capable of storing programming instructions, that, when read and executed by the processing system, cause server to generate a programming update for a target module 114 in the vehicle 102 and transmit the programming update to the update module 110. Accordingly, for purposes of explanation, the remote device 104 may alternatively be referred to herein as a server. In some embodiments, the server 104 may be coupled to a database 105 that stores or otherwise maintains executable code or instructions corresponding to various programming updates capable of being generated by the server 104 along with authentication information utilized to support the programming processes described in greater detail below in the context of FIGS. 3-4.

Still referring to FIG. 1, the update module 110 generally represents the device or component within the vehicle 102 that is communicatively coupled to the external communications network 106 and configured to support communications with the server 104 for purposes of obtaining programming updates for one or more target module 114 within the vehicle 102. In accordance with one or more embodiments, the update module 110 is realized as a head unit that may be integrated in the dashboard, instrument panel, center console, or another suitable location within the vehicle 102. In the illustrated embodiment, the update engine 120 generally represents a software module or another component that is generated, executed, or otherwise implemented by the update module 110 to facilitate the programming processes described herein.

In exemplary embodiments, the update module 110 is coupled to at least one vehicle communications network 111 and provides an interface between the external communications network 106 and the vehicle communications network 111. Depending on the embodiment, the vehicle communications network 111 may be realized as a local area network (LAN) or Ethernet network, a wireless network (e.g., a Bluetooth network, an IEEE 802.11 network, or the like), a controller area network (CAN), or the like. The gateway module 112 generally represents the device or component within the vehicle 102 that is communicatively coupled to the update module 110 via a first vehicle communications network 111 and configured to regulate or otherwise control programming of the target module 114 within the vehicle 102 by verifying or otherwise authenticating requests for programming updates that are received from the update module 110 are authorized by the server 104. In this regard, the gateway module 112 functions as a gateway between the first vehicle communications network 111 that the update module 110 communicates on and a second vehicle communications network 113 having the target module 114 communicatively coupled thereto. For example, in one embodiment, the first vehicle communications network 111 is realized as an Ethernet network and the second vehicle communications network 113 is realized as a CAN, wherein the gateway module 112 provides a gateway between the Ethernet network and the CAN bus.

In the illustrated embodiment of FIG. 1, the authentication engine 122 generally represents a software module or another component that is generated, executed, or otherwise implemented by the gateway module 112 to receive a request for a programming session from the update engine 120, dynamically generate session authentication information and provide the session authentication information to the update engine 120 in response to the request, and verify authorization authentication information received from the update module 110 matches authentication information stored by the gateway module 112 based at least in part on the session authentication information. After verifying or otherwise authenticating the authorization information is from the trusted remote device 104, the authentication engine 122 allows the programming update to be performed at the target module 114, for example, by routing commands to enter a programming mode and corresponding programming data from the update module 110 to the target module 114.

Still referring to FIG. 1, the target module 114 generally represent any sort of hardware, component, device, or module that is coupled to the vehicle communications network 113 and capable of being programmed by the update module 110, such as, for example, an engine control unit (ECUs), a traction control system (or traction controller), a power steering system (or power steering controller), a braking system (or brake controller), a climate control system (or climate controller), a navigation system (or navigation controller), an infotainment system, or the like. In the illustrated embodiment of FIG. 1, the target application 124 generally represents a software module or another component that is generated, executed, or otherwise implemented by or on the target module 114 to control, manage, or otherwise regulate the features and/or functionality provided by the target module 114. For example, if the target module 114 is a braking system, the target application 124 may be the application that controls the anti-lock braking functionality of the braking system.

In exemplary embodiments, a programming update obtained by the update module 110 and/or the update engine 120 from the server 104 includes a set of executable instructions (e.g., code, script, or the like) that are capable of being read and executed by the target module 114 (or a component thereof) to modify operation of its target application 124. For example, the existing code or instructions for implementing the target application 124 may be modified (e.g., by adding or incorporating new code or instructions, deleting or overwriting at least a portion of the existing code or instructions, and the like) and/or the parameters, settings and/or other configuration information referenced by the code or instructions of the target application 124 may be modified (e.g., changing or overwriting existing configuration information, adding or incorporating new configuration information referenced by existing and/or new code or instructions, and the like). Modifying the underlying code and/or configuration information upon which the application 124 is based influences the subsequent operation of the application 124, which, in turn, influences subsequent operation of the target module 114. In this manner, programming updates received from the server 104 may be applied to a target module 114 to modify existing features and/or functionality of the target module 114 or provide new features and/or functionality to the target module 114.

It should be understood that FIG. 1 is a simplified representation of a vehicle communications system 100 for purposes of explanation and is not intended to limit the scope or applicability of the subject matter described herein in any way. In this regard, practical embodiments of the vehicle 102 may include any number of potential target modules 114 and/or any number of vehicle communications networks 111, 113 to support or otherwise provide any number of features and/or functionality for the vehicle 102. Additionally, in alternative embodiments, the remote device 104 may be realized as an external device that is communicatively coupled to the update module 110 via an input interface coupled to the update module 110 as described in greater detail below in the context of FIG. 2, and in such embodiments of the vehicle communications system 100, the external communications network 106 and/or the database 105 may not be present. Furthermore, although FIG. 1 depicts the update module 110 and the gateway module 112 as separate and distinct, in some alternative embodiments, features and/or functionality of the update module 110 may be integrated into or otherwise implemented by the gateway module 112.

Figure 2:
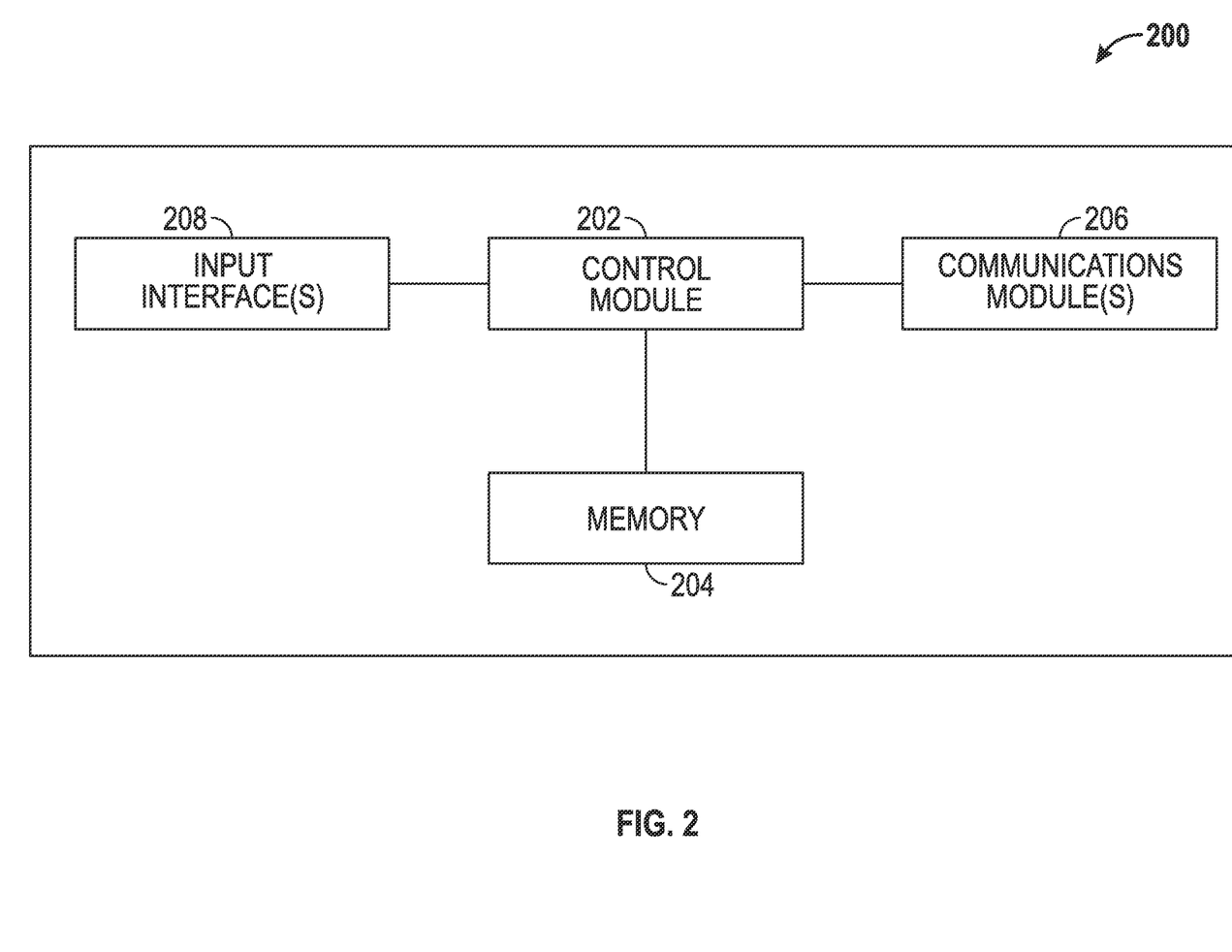
FIG. 2 is a block diagram of an exemplary electronic device suitable for use in the vehicle communications system of FIG. 1 in accordance with one or more embodiments.

FIG. 2 depicts an exemplary embodiment of an electronic device 200 suitable for use in the vehicle communications system 100 of FIG. 1. For example, the server 104 and/or one or more of the modules 110, 112, 114 may be realized as an instance of the electronic device 200. The illustrated electronic device 200 includes, without limitation, a control module 202, a data storage element (or memory) 204, one or more communications modules 206, and one or more input interfaces 208. It should be understood that FIG. 2 is a simplified representation of an electronic device 200 for purposes of explanation and is not intended to limit the scope or applicability of the subject matter described herein in any way.

The control module 202 generally represents the hardware, circuitry, processing logic, and/or other components of the electronic device 200 configured to support operation of the electronic device 200 and the various tasks, operations, functions and/or processes described herein. Depending on the embodiment, the control module 202 may be implemented or realized with a general purpose processor, a microprocessor, a controller, a microcontroller, a state machine, a content addressable memory, an application specific integrated circuit, a field programmable gate array, any suitable programmable logic device, discrete gate or transistor logic, discrete hardware components, or any combination thereof, designed to perform the functions described herein. Likewise, depending on the embodiment, the memory 204 may be realized using any sort of random access memory (RAM), read only memory (ROM), flash memory, registers, hard disks, removable disks, magnetic or optical mass storage, short or long term storage media, and/or any other non-transitory computer-readable medium capable of storing programming instructions for execution by the control module 202. The computer-executable programming instructions, when read and executed by the control module 202, cause the control module 202 to perform or otherwise support the various tasks, operations, functions, and processes described herein.

For example, referring to FIG. 1 and with continued reference to FIG. 2, when the update module 110 is realized as an instance of the electronic device 200, the memory 204 may store executable code, script, and/or instructions corresponding to the update engine 120 that, when read and executed by the control module 202, cause the control module 202 to generate the update engine 120 configured perform the various tasks, operations, functions, and processes described herein. Likewise, when the gateway module 112 is realized as an instance of the electronic device 200, the memory 204 may store executable code, script, and/or instructions that, when read and executed by the control module 202, cause the control module 202 to generate the authentication engine 122. In a similar manner, when the target module 114 is realized as an instance of the electronic device 200, the memory 204 stores executable code, script, and/or instructions corresponding to the application 124 that is generated, executed, or otherwise implemented by the target module 114. Additionally, the memory 204 may store various parameters, settings and/or other configuration information referenced by the code or instructions of the target application 124 to provide the desired features and/or functionality for the target module 114. As described in greater detail below in the context of FIGS. 3-4, after programming or updating of the target module 114 is authenticated, verified, or otherwise approved, the control module 202 of that target module 114 executes the set of instructions contained in the programming data received from the update module 110 and/or the update engine 120 to modify, overwrite, or otherwise update the code and/or configuration information for the target application 124 that is maintained in the memory 204, thereby updating the target application 124 of the target module 114.

Referring again to FIG. 2, the communications module(s) 206 generally represents the hardware, circuitry, logic, firmware and/or other components of the electronic device 200 configured to support communications to/from the electronic device 200 via one or more communications networks. For example, referring again to FIG. 1 and with continued reference to FIG. 2, when the update module 110 is realized as an instance of the electronic device 200, the electronic device 200 may include a first instance of a communications module 206 that supports communications over the external communications network 106, such as one or more transceiver modules (e.g., a cellular transceiver), and a second instance of a communications module 206 that supports communications over the first vehicle communications network 111, such as a network adapter (e.g., an Ethernet adapter, an 802.11 adapter, a Bluetooth adapter, or the like). Similarly, when the gateway module 112 is realized as an instance of the electronic device 200, a first instance of a communications module 206 within the electronic device 200 may be realized a first network adapter (e.g., an Ethernet adapter, an 802.11 adapter, a Bluetooth adapter, or the like) that supports communications over the first vehicle communications network 111 and a second instance of a communications module 206 within the electronic device 200 may be realized as a second network adapter (e.g., a CAN interface, or the like) that supports communications over the second vehicle communications network 113.

Still referring to FIG. 2, the input interface(s) 208 generally represents the hardware, circuitry, and/or other components that provide a physical interface to/from the electronic device 200 for receiving input and/or output from a user or another external hardware component. For example, the input interface(s) 208 may include one or more buttons, keys, touch panels (or touchscreens), computer mice, sensors, transducers, or other suitable devices adapted to receive input from a user. In some embodiments, the input interface(s) 208 may also include one or more ports or slots, such as, for example, a universal serial bus (USB) port, a memory card slot, or the like. In this regard, although the subject matter may be described herein in the context of the update module 110 receiving programming updates from the server 104 via the network 106, in alternative embodiments, the update module 110 may obtain programming updates from an external remote device that is inserted into an input interface coupled to the update module 110. For example, referring again to FIG. 1, when the update module 110 is realized as an instance of the electronic device 200, the update module 110 may obtain programming updates from an external disk drive, an external memory card, or another external device that is inserted into an input interface 208 of the update module 110.

Figure 3:
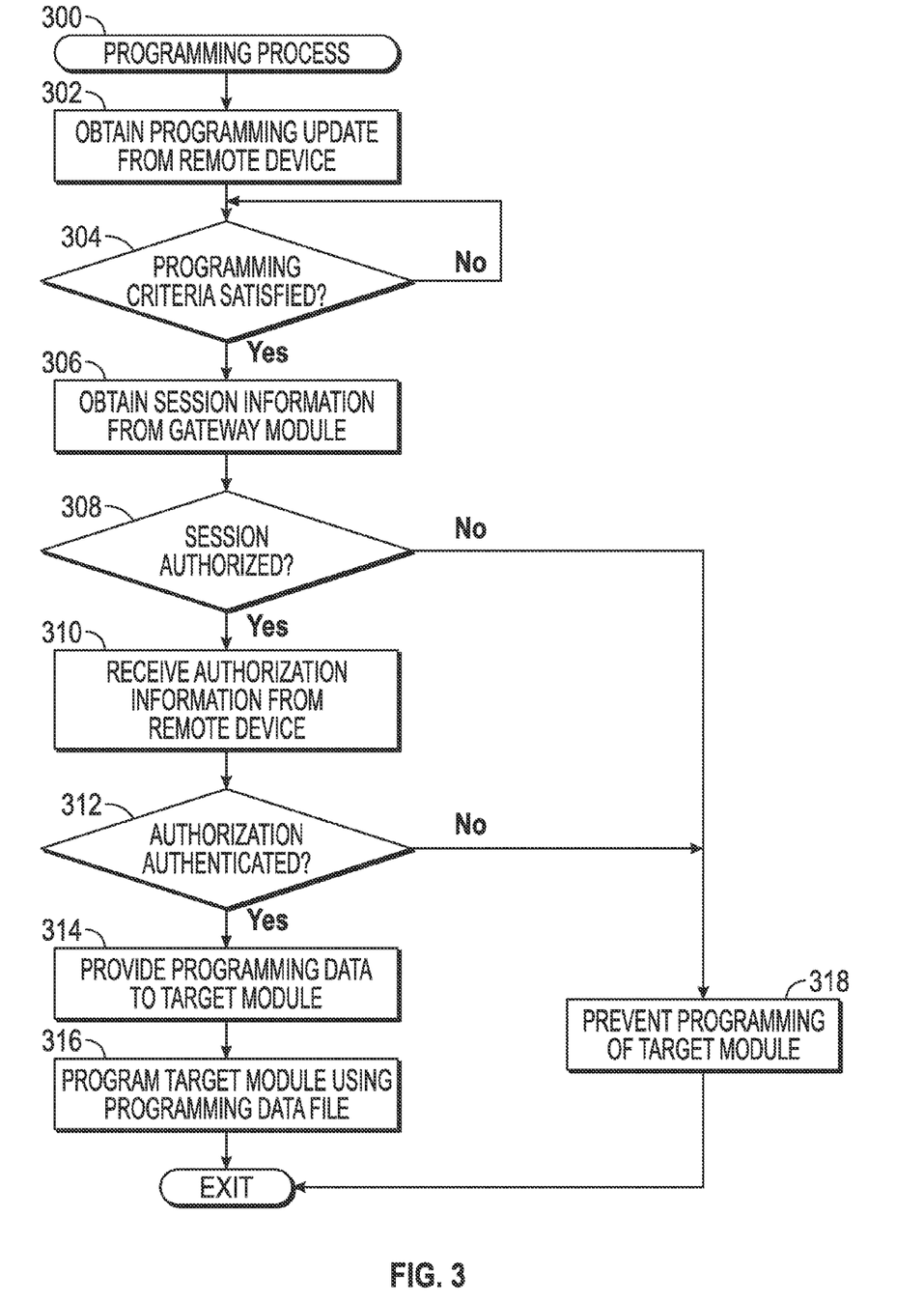
FIG. 3 is a flow diagram illustrating an exemplary programming process suitable for implementation by the vehicle communications system of FIG. 1 in accordance with one or more embodiments.

FIG. 3 depicts an exemplary embodiment of a programming process 300 for programming or otherwise updating a target module in a vehicle. The various tasks performed in connection with the illustrated process 300 may be performed by hardware, suitably configured analog circuitry, software executed by processing circuitry, firmware executable by processing circuitry, or any combination thereof. For illustrative purposes, the following description may refer to elements mentioned above in connection with FIGS. 1-2. In practice, portions of the programming process 300 may be performed by different elements of the vehicle communications system 100, such as, for example, the server 104, the update module 110, the gateway module 112, the target module 114, the control module 202, the memory 204, the communications module 206 and/or the input interface 208. It should be appreciated that practical embodiments of the programming process 300 may include any number of additional or alternative tasks, the tasks need not be performed in the illustrated order and/or the tasks may be performed concurrently, and/or the programming process 300 may be incorporated into a more comprehensive procedure or process having additional functionality not described in detail herein. Moreover, one or more of the tasks shown and described in the context of FIG. 3 could be omitted from a practical embodiment of the programming process 300 as long as the intended overall functionality remains intact.

In exemplary embodiments, the programming process 300 begins by receiving or otherwise obtaining a programming update for a particular target module in a vehicle at 302. For example, in accordance with one or more embodiments, the update module 110 periodically polls the server 104 over the network 106 for programming updates that are applicable to any target module(s) 114 in the vehicle 102. In other embodiments, a user may manipulate an input interface 208 of the update module 110 to indicate a desire to check for updates for the vehicle modules 114, 116, which, in turn, results in the update module 110 transmitting a request for programming updates to the server 104. In yet other embodiments, a user may manipulate an input interface 208 of the target module 114 in the vehicle 102 to indicate a desire to check for updates to the application 124 on that target module 114, which, in turn, results in the target module 114 transmitting a request for programming updates to the update module 110.

In accordance with one or more embodiments, to obtain a programming update from the server 104, the update engine 120 on the update module 110 generates a polling request that includes identification information (e.g., a vehicle identification number or the like) stored or otherwise maintained by the update module 110 (e.g., in memory 204), which, in turn, is utilized by the server 104 to identify or otherwise determine the particular model for the vehicle 102 and/or current versioning information for the target applications 124 of the target module 114 in the vehicle 102. Using the identification information, the server 104 may query or otherwise access the database 105 to determine whether any programming updates exist that are applicable to the vehicle 102 (e.g., programming updates associated with a target module 114 onboard the vehicle 102). In response to identifying an update for the target module 114 in the vehicle 102, the server 104 generates a programming update for the vehicle 102 and transmits or otherwise provides that programming update to the update engine 120 on the update module 110 via the network 106. The programming update generated by the server 104 includes a programming data portion, and to generate the programming data portion, the server 104 may utilize the identification information for the vehicle 102 to query or otherwise access the database 105 to obtain the set of instructions corresponding to the program update for the target module 114 and include or otherwise encapsulate that set of instructions in the programming data portion.

It should be noted that in other embodiments, instead of the update module 110 periodically polling the server 104 for programming updates, the server 104 may automatically push programming updates to the update module 110, either on a periodic basis or as programming updates become available. For example, the server 104 may periodically access the database 105 to compare stored versioning information for the target application 124 in the vehicle 102 to current versioning information associated with program updates for that target application 124 maintained by the database 105. When the versioning information indicates the target application 124 on the target module 114 should be updated (e.g., because the current versioning information associated with a programming update for the target application 124 maintained by the database 105 indicates the programming update is newer), the server 104 automatically generates a programming update for the target module 114 and pushes or otherwise transmits the programming update to the update module 110.

In yet other embodiments, the update module 110 and/or the update engine 120 may obtain the programming update from an external device (e.g., an external memory drive, card, disk, or the like) inserted in an input interface 208 of the update module 110. For example, a programming update generated by the server 104 may be stored or otherwise saved on an external device that is capable of being inserted in the input interface 208 of the update module 110. Upon insertion of an external device in the input interface 208, the update engine 120 and/or the control module 202 may automatically scan or otherwise access the external device via the input interface 208 to obtain any programming updates for the target module 114 in the vehicle 102 that reside on the external device.

Still referring to FIG. 3, after obtaining the programming update, the programming process 300 continues by determining whether programming criteria for the target module are satisfied at 304. In this regard, the update module 110 and/or the update engine 120 may maintain (e.g., in memory 204) programming criteria that limit what operating state(s) that the target module 114 and/or other components of the vehicle 102 are required to be operated in before programming of the target module 114 can be initiated. For example, if the target module 114 is an ECU, a brake controller, a steering controller, or the like, the programming criteria may require that the target module 114 is in an idle state and that the transmission in the vehicle 102 is locked or otherwise in the parked position before programming of the target module 114 can be initiated. Conversely, if the target module 114 is a climate controller (or climate control system), the programming criteria may require that only the climate control system is in an idle or deactivated state (e.g., turned off). In this regard, the update module 110 and/or the update engine 120 obtains or otherwise identifies the current status of the target module 114 and/or other vehicle components and determines whether the programming session can be initiated based on the programming criteria for the intended target module 114 and the obtained status of the target module 114 and/or other vehicle components. In exemplary embodiments, when the update module 110 and/or the update engine 120 determines that the programming session cannot be initiated (e.g., because the current status of a target module 114 does not satisfy the applicable programming criteria), the update module 110 and/or the update engine 120 stores or otherwise maintains the programming update in memory 204 and periodically repeats the steps of obtaining the current status of the target module 114 and/or other vehicle components and comparing the obtained status to the programming criteria associated with the intended target module 114.

When programming process 300 determines the current status of the target module and/or other vehicle components satisfy the programming criteria for the target module, the programming process 300 continues by obtaining session authentication information from the gateway module at 306, determining or otherwise identifying whether the programming session is authenticated and authorized at 308, and when the programming session is authenticated and authorized, receiving or otherwise obtaining authorization authentication information that is encrypted using the session authentication information at 310. As described in greater detail below in the context of FIG. 4, in exemplary embodiments, the update engine 120 transmits or otherwise provides a request message or another indication of a desire to program the target module 114 to the authentication engine 122 via the network 111. In response to receiving the request for a programming session, the authentication engine 122 dynamically generates session authentication information and transmits or otherwise provides the session authentication information to the update engine 120 via the network 111. In exemplary embodiments, the session authentication information includes a public key generated by the authentication engine 122 based at least in part on a private key associated with the vehicle 102 that is maintained by the gateway module 112 and a current time (or timestamp) associated with the programming request using a hash function or another cryptographic algorithm that is known by the server 104. In exemplary embodiments, the gateway module 112 stores or otherwise maintains (e.g., in memory 204) the session authentication information in association with a programming request for use in decrypting authorization authentication information subsequently provided by the update module 110, as described in greater detail below.

In response to receiving the session authentication information from the authentication engine 122, the update engine 120 transmits or otherwise provides an authorization request message or another indication of a desire to program the target module 114 to the server 104 via the network 106. The programming authorization request includes the session authentication information generated by the gateway module 112 and/or the authentication engine 122 and in response to receiving the programming authorization request, the server 104 determines whether programming of the target module 114 is authorized based at least in part on the session authentication information. In this regard, the server 104 decrypts the session authentication information to confirm that the trusted gateway module 112 in the vehicle 102 is the source of the session authentication information, for example, by confirming that the private key used to encrypt the session authentication information matches the private key associated with the vehicle 102 that is stored or otherwise maintained in the database 105.

After authenticating or otherwise verifying the session authentication information, the server 104 determines whether programming of the target module 114 is authorized based one or more additional criteria, such as, for example, a frequency and/or amount of programming requests received for the particular target module 114, a frequency and/or amount of programming requests received for the vehicle 102, a frequency and/or amount of programming requests received from the particular update module 110, a frequency and/or amount of programming requests received from a particular location on the network 106, and the like. In this regard, the database 105 may maintain a number of different threshold values that are utilized by the server 104 to identify programming requests that are potentially malicious or otherwise indicative of a potential cyberattack. For example, the server 104 may fail to authorize programming of the target module 114 when a number of requests to program the target module 114 over a particular length of time exceeds a threshold value for an allowed number of programming sessions for that particular target module 114 over that length of time or when a number of requests received from the update module 110 over a particular length of time exceeds a threshold value for an allowed cumulative number of programming sessions for any modules in the vehicle 102 over that length of time. In this regard, for each programming request received by the server 104, the server 104 and/or the database 105 may store or otherwise maintain information identifying the vehicle 102 associated with the programming request, the target module 114 associated with the request, the update module 110 associated with the request, a location on the network 106 associated with the source of the request (e.g., an internet protocol (IP) address for the update module 110), and the like.

When the server 104 authenticates the session authentication information as being from the gateway module 112 and determines the programming request is authorized (e.g., because the number of received programming requests does not exceed any applicable thresholds), the server 104 generates authorization authentication information utilized by the gateway module 112 to authenticate the programming of the target module 114 is authorized by the trusted remote device 104. In exemplary embodiments, the server 104 generates the authorization encryption information by encrypting a private key associated with the vehicle 102 using the public key obtained from the session authentication information and a hash function or other cryptographic algorithm that is known to the gateway module 112. Thereafter, the server 104 transmits or otherwise provides the authorization authentication information to the update module 110 and/or the update engine 120 via the network 106. Conversely, when the server 104 determines that the programming request is not authenticated or is otherwise unauthorized, the server 104 fails to provide authorization authentication information to the update module 110 and/or the update engine 120, and thus, the programming process 300 prevents the unauthorized programming session from being initiated with the target module at 318, as described in greater detail below.

Still referring to FIG. 3, after obtaining authorization information, the programming process 300 continues by verifying or otherwise authenticating the source of the authorization is a trusted remote device using the authorization authentication information at 312. In this regard, in response to obtaining the authorization authentication information from the remote device 104, the update engine 120 transmits the authorization authentication information to the authentication engine 122 via the vehicle communications network 111. In response to receiving the authorization authentication information, the authentication engine 122 decrypts the authorization authentication information using the stored public key and/or other session authentication information that was previously generated by the authentication engine 122 in association with the programming request. When a decrypted private key obtained from the decrypted authorization authentication information matches the stored private key associated with the vehicle 102, the authentication engine 122 determines that the source of the programming update authorization is trusted, verified, or otherwise authenticated and that the programming session is allowed or otherwise authorized.

After the programming process 300 determines that the programming update is authorized by an authenticated remote device, the programming process 300 is completed by transmitting or otherwise providing the programming data for the programming update to the target module via the gateway module at 314 and programming the target module using the programming data at 316. In this regard, the authentication engine 122 may provide a response to the programming request or another indication to the update engine 120 that the programming session is granted or otherwise authorized. Thereafter, the gateway module 112 and/or the authentication engine 122 functions as a gateway between the first vehicle communications network 111 and the second vehicle communications network 113 and routes or otherwise retransmits data received from the update module 110 and/or the update engine 120 to the target module 114 and/or the target application 124. In some embodiments, the gateway module 112 and/or the authentication engine 122 may be configured to implement a timer or another similar feature and only route communications from the first vehicle communications network 111 to the second vehicle communications network 113 and/or the target module 114 for a limited duration of time. In other words, the gateway functionality provided by the gateway module 112 and/or the authentication engine 122 may not remain open indefinitely.

In accordance with one or more embodiments, to implement the programming update, the update engine 120 signals or otherwise commands the target module 114 to enter a programming mode, and in response to receiving a programming mode command from the update engine 120, the target module 114 enters the programming mode. In alternative embodiments, the user may manipulate an input interface 208 of the target module 114 to cause the target module 114 to enter the programming mode (e.g., as part of a check for updates). After commanding the target module 114 to enter the programming mode, the update engine 120 transmits or otherwise provides the programming data for the programming update to the gateway module 112 via the first vehicle communications network 111, and the gateway module 112 automatically routes or otherwise retransmits the programming data to the target module 114 via the second vehicle communications network 113. When the target module 114 is in the programming mode, the target module 114 is configured to automatically execute or otherwise implement the set of instructions from the programming data to modify its respective target application 124, as described above. For example, in response to receiving a command to enter the programming mode from the update engine 120, the target module 114 may enter a boot mode (or boot loader mode) to place the control module 202 in a state where the control module 202 automatically executes the instructions contained in the programming data upon receipt of the programming data from the update module 110 and/or the update engine 120 via the gateway module 112 and the second communications network 113.

Still referring to FIG. 3, in response to determining the programming session is not authorized or that the source of the authorization is not authenticated, the programming process 300 prevents or otherwise restricts programming of the target module at 318. For example, when the server 104 determines that the private key from the decrypted session authentication information does not match the private key associated with the vehicle 102 and/or that a number of programming requests exceeds an allowed threshold, the server 104 determines the programming session is not authorized and fails to provide authorization authentication information to the update module 110 and/or the update engine 120 in response to a programming authorization request. In exemplary embodiments, the gateway module 112 does not provide gateway functionality from the first vehicle communications network 111 to the second vehicle communications network 113 by default. Thus, failing to provide authorization authentication information to the update module 110 prevents the gateway module 112 from authenticating the programming update as being authorized and enabling the gateway functionality from the first vehicle communications network 111 to the second vehicle communications network 113, which, in turn, prevents the unauthorized programming session from being initiated with the target module 114. Similarly, when the private key obtained from the decrypted authorization authentication information does not match the stored private key associated with the vehicle 102, the gateway module 112 determines that the programming authorization is not authenticated and does not provide gateway functionality from the first vehicle communications network 111 to the second vehicle communications network 113, thereby preventing unauthenticated programming sessions and/or updates from being initiated with the target module 114.

Figure 4:
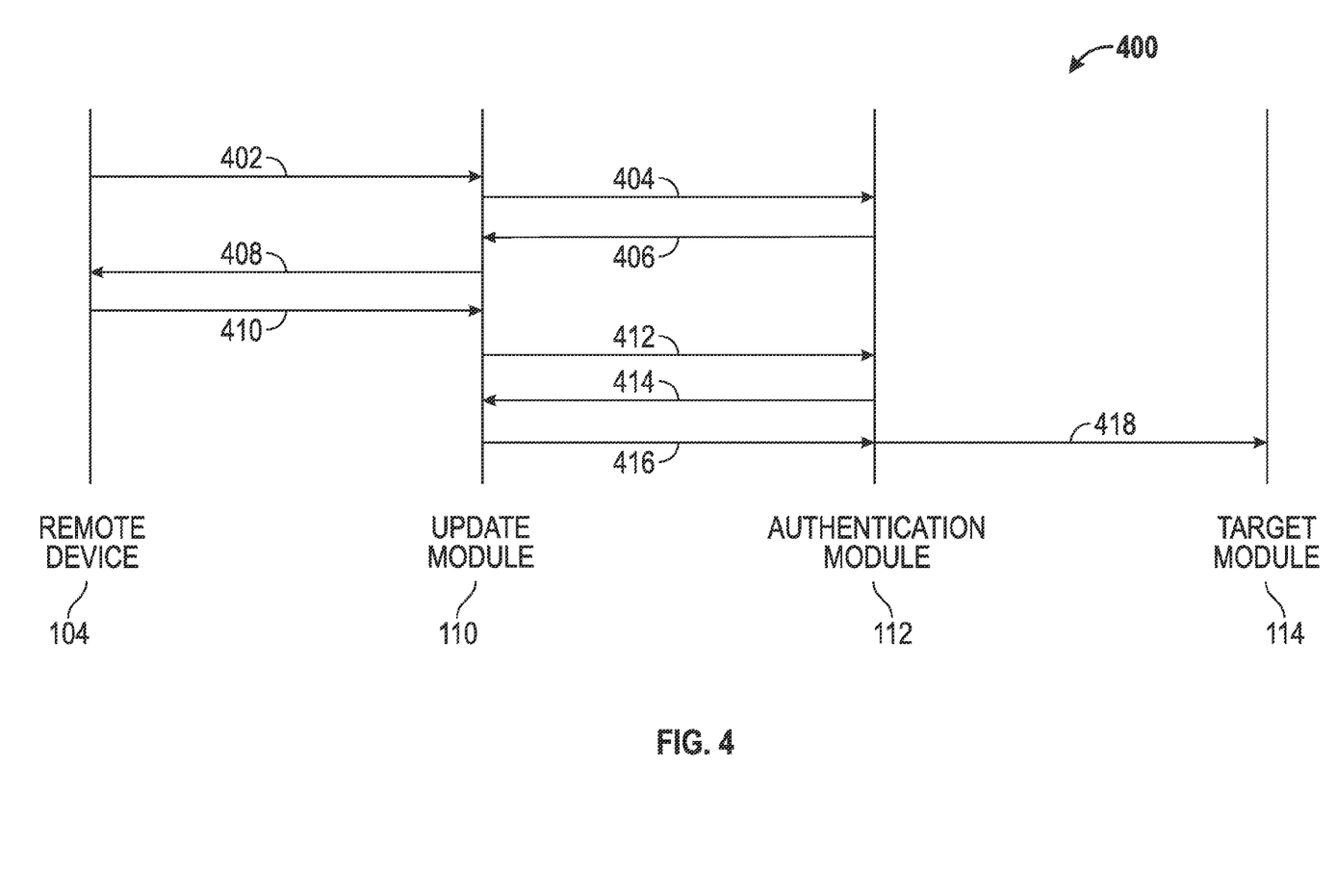
FIG. 4 is a diagram illustrating a sequence of communications within the vehicle communications system of FIG. 1 in accordance with one exemplary embodiment of the programming process of FIG. 3.

FIG. 4 depicts an exemplary sequence 400 of communications within the vehicle communications system 100 in accordance with an exemplary embodiment of the programming process 300 of FIG. 3. Referring to FIG. 4, and with continued reference to FIGS. 1-3, the illustrated sequence 400 begins with the update module 110 downloading, receiving, or otherwise obtaining 402 a programming update from a remote device 104, such as a server or an external memory drive (or disk or card). After obtaining the programming update and determining that programming criteria applicable to the programming update are satisfied, the update module 110 and/or the update engine 120 transmits 404 an initial request for a programming session to the authentication engine 122 on the gateway module 112 via the first communications network 111. In response, the authentication engine 122 dynamically generates a public key and/or other session authentication information based at least in part on a private key associated with the vehicle 102 that is stored by the gateway module 112. The authentication engine 122 transmits 406 the session authentication information to the update engine 120 in response to the initial programming request, and in response to receiving the session authentication information, the update engine 120 transmits or otherwise provides 408 a programming authorization request that includes the public key and/or other session authentication information to the remote device 104.

After the remote device 104 authenticates the public key and/or other session authentication information as being generated by the gateway module 112 in the vehicle 102 and verifying the programming request does not exceed any applicable thresholds, the remote device 104 generates authorization authentication information using the public key and/or other session authentication information by encrypting a private key associated with the vehicle 102 using the public key and/or other session authentication information. Thereafter, the remote device 104 transmits or otherwise provides 410 the authorization authentication information to the update module 110 and/or the update engine 120, which, in turn, transmits 412 the authorization information to the gateway module 112 and/or the authentication engine 122. The authentication engine 122 decrypts the authorization authentication information using the public key and/or other session authentication information and compares the decrypted authorization authentication information to stored authentication information to authenticate the authorization as being from a trusted source. In the illustrated embodiment, after the authentication engine 122 verifies that a decrypted private key matches a stored private key associated with the vehicle 102, the authentication engine 122 determines the programming session is authorized by an authenticated remote device 104 and transmits or otherwise provides 414 a response message to the update engine 120 that indicates that the request for the programming session has been granted, authorized, or otherwise allowed. Thereafter, the update engine 120 transmits 416 a programming mode command and the programming data for the programming update to the gateway module 112 via the first vehicle communications network 111, and the gateway module 112 automatically retransmits 418 the programming mode command and programming data to the target module 114 via the second vehicle communications network 113. After the target module 114 enters the programming mode and receives the programming data, the control module 202 of the target module 114 executes or otherwise implements the code, script and/or instructions from the programming data to effectuate the desired update to the target application 124.

One benefit of the subject matter described herein is that programming updates obtained from a remote device are not implemented unless they are authenticated as being authorized by a trusted source. Thus, applications on vehicle modules may be securely programmed or otherwise updated automatically using executable code, script and/or instructions received over an external network (e.g., a cellular network or the like) or from an external device inserted into an input interface of the vehicle and without requiring the vehicle to be serviced manually at a particular location (e.g., by a technician at a dealership).

For the sake of brevity, conventional techniques related to communications networks, authentication, software updating, automotive electronics and/or electrical systems, and other functional aspects of the subject matter may not be described in detail herein. In addition, certain terminology may also be used herein for the purpose of reference only, and thus are not intended to be limiting. For example, the terms "first", "second" and other such numerical terms referring to structures do not imply a sequence or order unless clearly indicated by the context. Additionally, the foregoing description also refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof. Accordingly, details of the exemplary embodiments or other limitations described above should not be read into the claims absent a clear intention to the contrary.

What is claimed is:

1. A method of programming a vehicle module of a vehicle, the method comprising:
   generating, by a gateway module communicatively coupled to the vehicle module in response to a programming request, session authentication information for a programming update for the vehicle module, the session authentication information including a public key dynamically generated by the gateway module based at least in part on a stored private key associated with the vehicle and a timestamp associated with the programming request;
   providing the session authentication information to a remote device via an external communications network, wherein the remote device generates authorization authentication information based at least in part on the public key;
   obtaining the authorization authentication information from the remote device via the external communications network;
   decrypting, by the gateway module, the authorization authentication information using the public key to obtain a decrypted key;
   authenticating, by the gateway module, the programming update based at least in part on the decrypted key matching the stored private key associated with the vehicle; and
   providing, via the gateway module, programming data for the programming update to the vehicle module after authenticating the programming update.

2. The method of claim 1, further comprising updating the vehicle module based at least in part on the programming data after providing the programming data for the programming update to the vehicle module.

3. The method of claim 2, the programming data including a set of instructions, wherein updating the vehicle module comprises the vehicle module executing the set of instructions to update an application on the vehicle module.

4. The method of claim 1, wherein authenticating the programming update comprises:
   comparing, by the gateway module, the decrypted key to the stored private key associated with the vehicle; and
   authenticating the programming update when the decrypted key matches the stored private key.

5. The method of claim 4, wherein the remote device generates the authorization authentication information by encrypting the stored private key using the session authentication information in response to determining the programming update is authorized based at least in part on the session authentication information.

6. A vehicle comprising:
   a first vehicle communications network;
   a second vehicle communications network different from the first vehicle communications network;
   a target vehicle module coupled to the first vehicle communications network;
   a gateway module communicatively coupled to the target vehicle module via the first vehicle communications network, the gateway module generating session authentication information for a programming update for the target vehicle module in response to a programming request, the session authentication information including a public key dynamically generated by the gateway module based at least in part on a stored private key associated with the vehicle and a timestamp associated with the programming request; and an update module communicatively coupled to the gateway module via the second communications network to provide authorization authentication information received from an external communications network and programming data to the gateway module, wherein:

the gateway module is configured to:
- verify programming the target vehicle module is authorized based at least in part on authenticating the authorization authentication information is provided from a trusted remote device by decrypting the authorization authentication information using the public key to obtain a decrypted key and authenticating the programming update based at least in part on the decrypted key matching the stored private key associated with the vehicle; and
- provide the programming data to the target vehicle module via the first vehicle communications network after verifying the programming is authorized.

7. The vehicle of claim 6, wherein the update module is a head unit.

8. The vehicle of claim 6, wherein the gateway module is configured to:
- obtain a decrypted key from the authorization authentication information using session authentication information; and
- verify the programming is authorized when the decrypted key matches the stored private key.

9. The vehicle of claim 8, the update module providing the programming request to the gateway module, wherein the gateway module is configured to generate the session authentication information in response to the programming request from the update module.

10. The vehicle of claim 9, wherein the update module is configured to provide the session authentication information to a remote device, the remote device generating the authorization authentication information by encrypting a key associated with the vehicle using the session authentication information provided by the update module after determining the programming of the target vehicle module is authorized.

11. The vehicle of claim 6, wherein the gateway module is coupled between the first vehicle communications network and the second vehicle communications network.

12. The vehicle of claim 11, wherein the first vehicle communications network is an Ethernet network and the second communications network is a controller area network (CAN).

13. The vehicle of claim 11, wherein the update module is communicatively coupled to a remote device via an external communications network to receive the authorization authentication information from the remote device, the remote device generating the authorization authentication information after determining the programming of the target vehicle module is authorized.

14. The vehicle of claim 6, wherein the target vehicle module is configured to update an application on the target vehicle module based at least in part on the programming data.

15. The vehicle of claim 14, the programming data including a set of instructions, wherein the target vehicle module updates the application by executing the set of instructions.

16. A vehicle system comprising:
- a first vehicle communications network;
- a second vehicle communications network;
- a target vehicle module coupled to the second vehicle communications network;
- an update vehicle module coupled to the first vehicle communications network and an external communications network; and
- a gateway module coupled to the first vehicle communications network and the second vehicle communications network, wherein:

the update vehicle module is configured to obtain programming data for the target vehicle module, transmit session authentication information to a remote device via the external vehicle communications network, receive authorization authentication information from a remote device via the external communications network, and provide the authorization authentication information and the programming data to the gateway module via the first vehicle communications network;

the gateway module is configured to generate the session authentication information for the programming data, the session authentication information including a public key dynamically generated by the gateway module based at least in part on a stored private key associated with the vehicle and a timestamp associated with a programming request, decrypt the authorization authentication information using the session authentication information to obtain a decrypted key, provide the programming data to the target vehicle module after authenticating the authorization authentication information by determining the decrypted key matches the stored private key associated with the vehicle; and the target vehicle module is configured to update an application on the target vehicle module based at least in part on the programming data after receiving the programming data from the gateway module.

17. The vehicle system of claim 16, wherein
the remote device generates the authorization authentication information based at least in part on the session authentication information in response to determining that programming the target vehicle module is authorized based at least in part on the session authentication information.

* * * * *